(12) United States Patent
Makino et al.

(10) Patent No.: US 10,500,673 B2
(45) Date of Patent: Dec. 10, 2019

(54) PRODUCTION METHOD FOR WELDED BODY AND PRODUCTION METHOD FOR GAS SENSOR

(71) Applicant: NGK INSULATORS, LTD., Nagoya-shi, Aichi (JP)

(72) Inventors: Miyoshi Makino, Obu (JP); Kenji Isaka, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 879 days.

(21) Appl. No.: 14/841,887

(22) Filed: Sep. 1, 2015

(65) Prior Publication Data

US 2016/0114420 A1    Apr. 28, 2016

(30) Foreign Application Priority Data

Oct. 22, 2014    (JP) ................................. 2014-215498

(51) Int. Cl.
| | |
|---|---|
| B23K 11/00 | (2006.01) |
| B23K 11/093 | (2006.01) |
| B23K 11/14 | (2006.01) |
| B23K 11/34 | (2006.01) |

(52) U.S. Cl.
CPC .......... B23K 11/0935 (2013.01); B23K 11/14 (2013.01); B23K 11/34 (2013.01)

(58) Field of Classification Search
CPC ..... B23K 11/0935; B23K 11/14; B23K 11/34; B23K 11/066; B23K 11/093; B23K 11/36; B23K 11/087
USPC .... 219/67, 104, 78.1, 86.1, 119, 59.1, 86.24
See application file for complete search history.

(56) References Cited

U.S. PATENT DOCUMENTS

| | | | | |
|---|---|---|---|---|
| 2,824,212 A | * | 2/1958 | Roberts | ................ B23K 11/004 |
| | | | | 165/178 |
| 4,331,280 A | * | 5/1982 | Terabayashi | ......... B23K 20/129 |
| | | | | 228/114.5 |
| 4,676,427 A | * | 6/1987 | Constance | .............. B60T 11/16 |
| | | | | 219/107 |
| 2004/0035831 A1 | | 2/2004 | Ananthanarayanan et al. | |

(Continued)

FOREIGN PATENT DOCUMENTS

| | | |
|---|---|---|
| EP | 2505295 A1 | 10/2012 |
| JP | 56-144881 A | 11/1981 |
| JP | 4-237580 A | 8/1992 |

(Continued)

OTHER PUBLICATIONS

The Extended European Search Report for the corresponding European patent application No. 15184300.0 dated May 18, 2016.

*Primary Examiner* — Dana Ross
*Assistant Examiner* — Ayub A Maye
(74) *Attorney, Agent, or Firm* — Global IP Counselors, LLP

(57) ABSTRACT

In a main metal piece 60 and an inner cylinder 70 serving as cylindrical bodies before welding, a second end surface 75 is an inclined surface that inclines toward an end portion opposite from the second end surface 75 as the second end surface 75 extends toward the center axis, and an angle θ2*a* is 5° to 15°. Thus, the distance between a first end surface 65 and the second end surface 75 positioned in resistance welding increases toward the center axis, and an angle θc (=angle θ2*a*) between the first end surface 65 and the second end surface 75 is 5° to 15°.

8 Claims, 8 Drawing Sheets

(56) References Cited

U.S. PATENT DOCUMENTS

2012/0248071 A1    10/2012  Ikoma
2014/0090827 A1*    4/2014  Iguchi ...................... F28F 9/02
                                                       165/176

FOREIGN PATENT DOCUMENTS

JP         2002-239738  A      8/2002
JP         2012-206148  A     10/2012
JP         2012-210637  A     11/2012

* cited by examiner

GAS TO BE MEASURED →

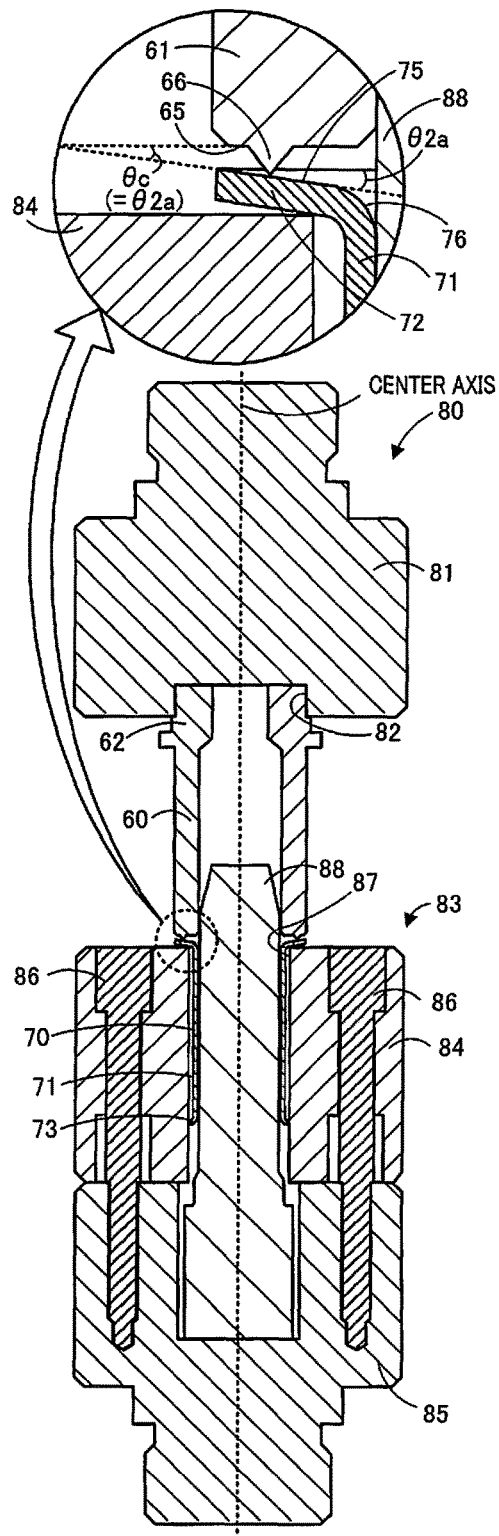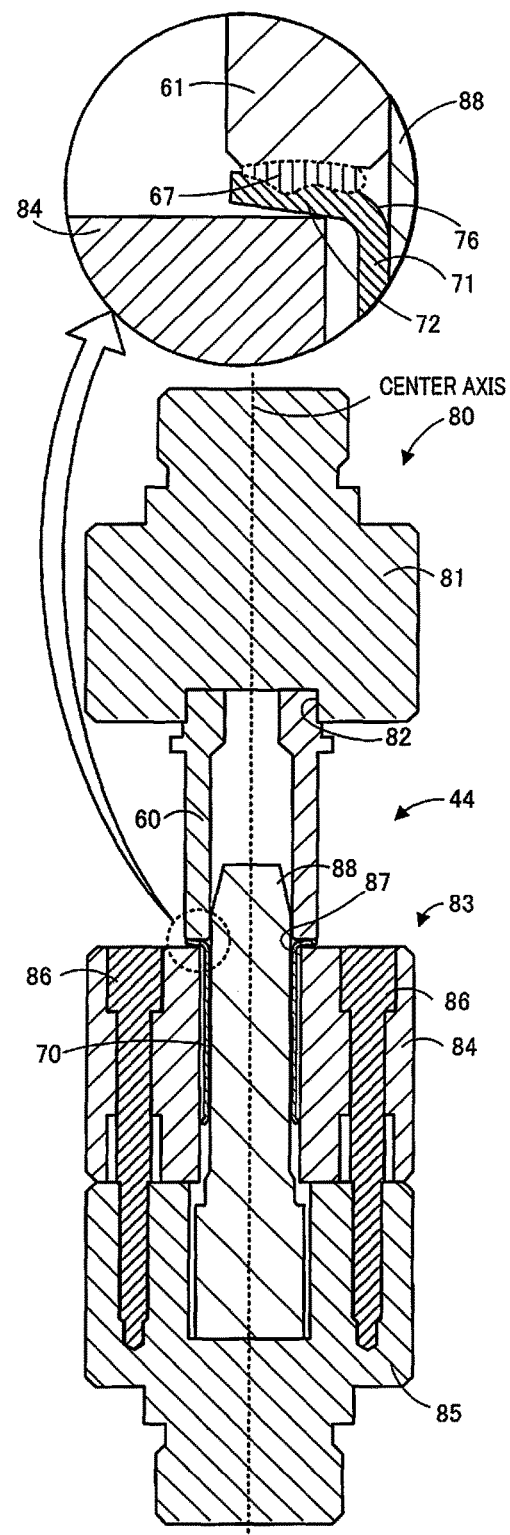

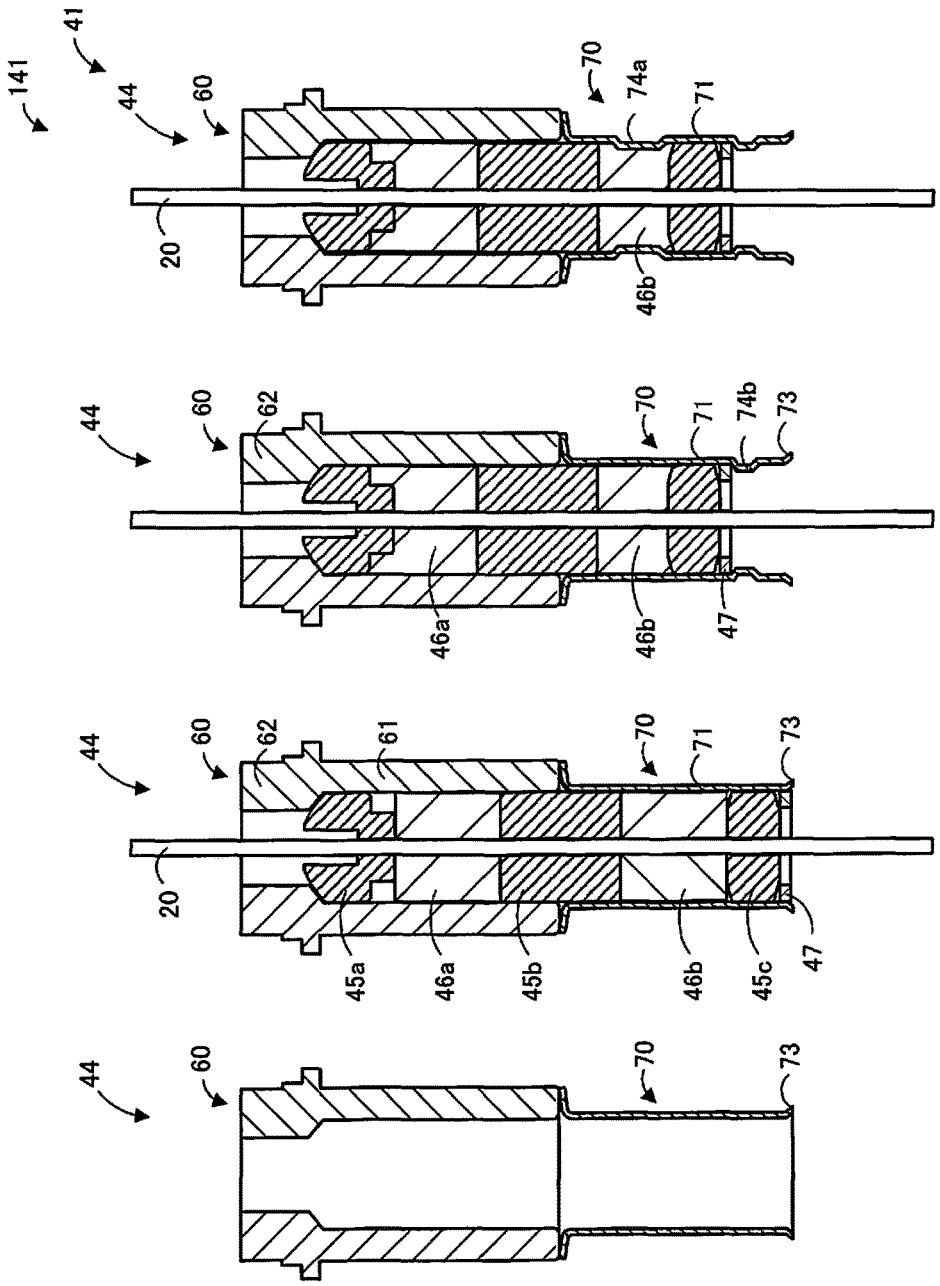

EXAMPLE 1

EXAMPLE 2

COMPARATIVE EXAMPLE 1

PRODUCTION METHOD FOR WELDED BODY AND PRODUCTION METHOD FOR GAS SENSOR

BACKGROUND OF THE INVENTION

1. Field of the Invention

The present invention relates to a production method for a welded body and a production method for a gas sensor.

2. Description of the Related Art

As a method for welding two members, there has hitherto been known resistance welding in which metallic members are brought into contact with each other, are clamped, and are welded by current that flows through contact surfaces thereof by pressurization and energization. For example, PTL 1 describes that two cylindrical members are coaxially resistance-welded with their end portions being in contact with each other.

CITATION LIST

Patent Literature

PTL 1: JP 2012-210637 A

SUMMARY OF THE INVENTION

When a welded body is produced by coaxially resistance-welding two cylindrical bodies, a protruding portion is sometimes formed outside outer peripheral surfaces of the two cylindrical bodies by protrusion of a part of metal melted in a joint portion of the cylindrical bodies toward the radial outer side. If the protruding portion is formed in the welded body, problems sometimes occur, for example, the welded body cannot be inserted into other members. For this reason, it is sometimes necessary to perform an operation of confirming the presence or absence of a protruding portion and an operation of removing the protruding portion during production of the welded body.

The present invention has been made to solve these problems, and a main object of the invention is to suppress formation of a protruding portion on the radial outer side when producing a welded body by coaxially welding two cylindrical bodies.

The present invention adopts the following means to achieve the above-described main object.

A production method for a welded body according to the present invention is a production method for a welded body in which a first cylindrical body and a second cylindrical body formed of metal are coaxially welded, and includes:

(a) a step of preparing the first cylindrical body and the second cylindrical body;

(b) a step of coaxially positioning the first cylindrical body and the second cylindrical body to bring into contact with each other while opposing a first end surface serving as an end surface of the first cylindrical body in an axial direction to a second end surface serving as an end surface of the second cylindrical body in the axial direction; and (c) a step of resistance-welding the first end surface and the second end surface to produce the welded body by energizing a contact portion between the first cylindrical body and the second cylindrical body in a state in which the first cylindrical body and the second cylindrical body are pressed in directions to approach each other, wherein, in the first cylindrical body and the second cylindrical body prepared in the step (a), at least one of the first end surface and the second end surface is an inclined surface that inclines toward an end portion opposite from the one end surface as the one end surface extends toward a center axis, and the inclined surface inclines so that a distance between the first end surface and the second end surface positioned in the step (b) increases toward the center axis and so that an angle $\theta c$ between the first end surface and the second end surface is 5° to 15°.

In this production method for the welded body, at least one of the first end surface of the first cylindrical body and the second end surface of the second cylindrical body is the inclined surface that inclines toward the end portion opposite from the one end surface as the one end surface extends toward the center axis. Because of the presence of the inclined surface, the distance between the first end surface and the second end surface positioned in the step (b) increases toward the center axis, and the angle $\theta c$ between the first end surface and the second end surface is 5° to 15°. Thus, in the joint portion during resistance welding in the step (c), melted metal more easily flows toward the center axis than toward the radial outer side of the first and second cylindrical bodies. For this reason, formation of a protruding portion on the radial outer side can be suppressed. When the angle $\theta c$ is 5° or more, the effect of suppressing formation of the protruding portion on the radial outer side can be obtained more reliably. Further, when the angle $\theta c$ is 15° or less, the joint strength between the first cylindrical body and the second cylindrical body in the welded body is sufficient.

In the production method for the welded body according to the present invention, the angle $\theta c$ may be 5° to 10°. When the angle $\theta c$ is 10° or less, the joint strength between the first cylindrical body and the second cylindrical body in the welded body is increased further.

In the production method for the welded body according to the present invention, in the first cylindrical body and the second cylindrical body prepared in the step (a), one of the first end surface and the second end surface may be the inclined surface, and the other end surface may be a surface perpendicular to the axial direction. In this case, compared with a case in which both of the first end surface and the second end surface are inclined surfaces, formation of the protruding portion on the radial outer side can be suppressed while giving a relatively simple shape to one of the cylindrical bodies.

In the production method for the welded body according to the present invention, the second cylindrical body prepared in the step (a) may include a cylindrical body portion having an outer diameter smaller than that of the first cylindrical body, and a flange portion provided coaxially with the body portion and having the second end surface. Thus, even when the outer diameter of of the body portion of the second cylindrical body is smaller than the outer diameter of the first cylindrical body, since the second cylindrical body has the flange portion, the joint area between the first end surface and the second end surface is ensured easily.

In this case, a rising portion of an inner peripheral surface from the body portion to the flange portion in the second cylindrical body prepared in the step (a) may be a curved surface. Thus, melted metal in the joint portion during resistance welding in the step (c) is unlikely to protrude to the radial inner side from an inner peripheral surface of the body portion of the second cylindrical body. For this reason, it is possible to suppress formation of the protruding portion on the radial inner side.

In the production method for the welded body according to the present invention, in the first cylindrical body and the second cylindrical body prepared in the step (a), one of the first end surface and the second end surface may have a projection, and the positioning may be performed in the step (b) so that the first cylindrical body and the second cylindrical body are in contact with each other with the projection being disposed therebetween. This allows the current of energization to be collected at the projection (projecting portion), and the first and second cylindrical bodies can be joined more reliably.

A production method for a gas sensor according to the present invention is a production method for a gas sensor including an outer cylinder, a welded body disposed inside the outer cylinder, and a sensor element disposed inside the welded body, and includes:

(1) a welded-body production step of producing the welded body by the production method for the welded body according to any one of claims 1 to 6;

(2) an element fixing step of inserting and fixing the sensor element in the welded body; and (3) an outer-cylinder fixing step of inserting at least a joint portion between the first cylindrical body and the second cylindrical body of the welded body into the outer cylinder and fixing an inner peripheral surface of the outer cylinder and an outer peripheral surface of the welded body in a state in which the inner peripheral surface of the outer cylinder and the outer peripheral surface of the welded body are in contact with each other.

In this production method for the gas sensor, since the welded body is produced by the above-described production method for the welded body of the present invention, effects similar to those of the above-described production method, for example, the effect of suppressing formation of a protruding portion on the radial outer side can be obtained. Further, in the step (3), at least the welded portion between the first cylindrical body and the second cylindrical body of the welded body is inserted into the outer cylinder, and the inner peripheral surface of the outer cylinder and the outer peripheral surface of the welded body are fixed to each other while being in contact with each other. For this reason, when a protruding portion is formed on the outer side of the outer peripheral surface of the welded body, it is necessary to perform the step (3) after removing the protruding portion. Therefore, it is highly significant to suppress formation of the protruding portion on the radial outer side.

BRIEF DESCRIPTION OF THE DRAWINGS

FIGS. 4A-4B show longitudinal sectional views schematically illustrating the manners of Step (b) and Step (c).

FIGS. 5A-5D show longitudinal sectional views schematically illustrating the manner of an element fixing step.

DETAILED DESCRIPTION OF THE INVENTION

Figure 1:
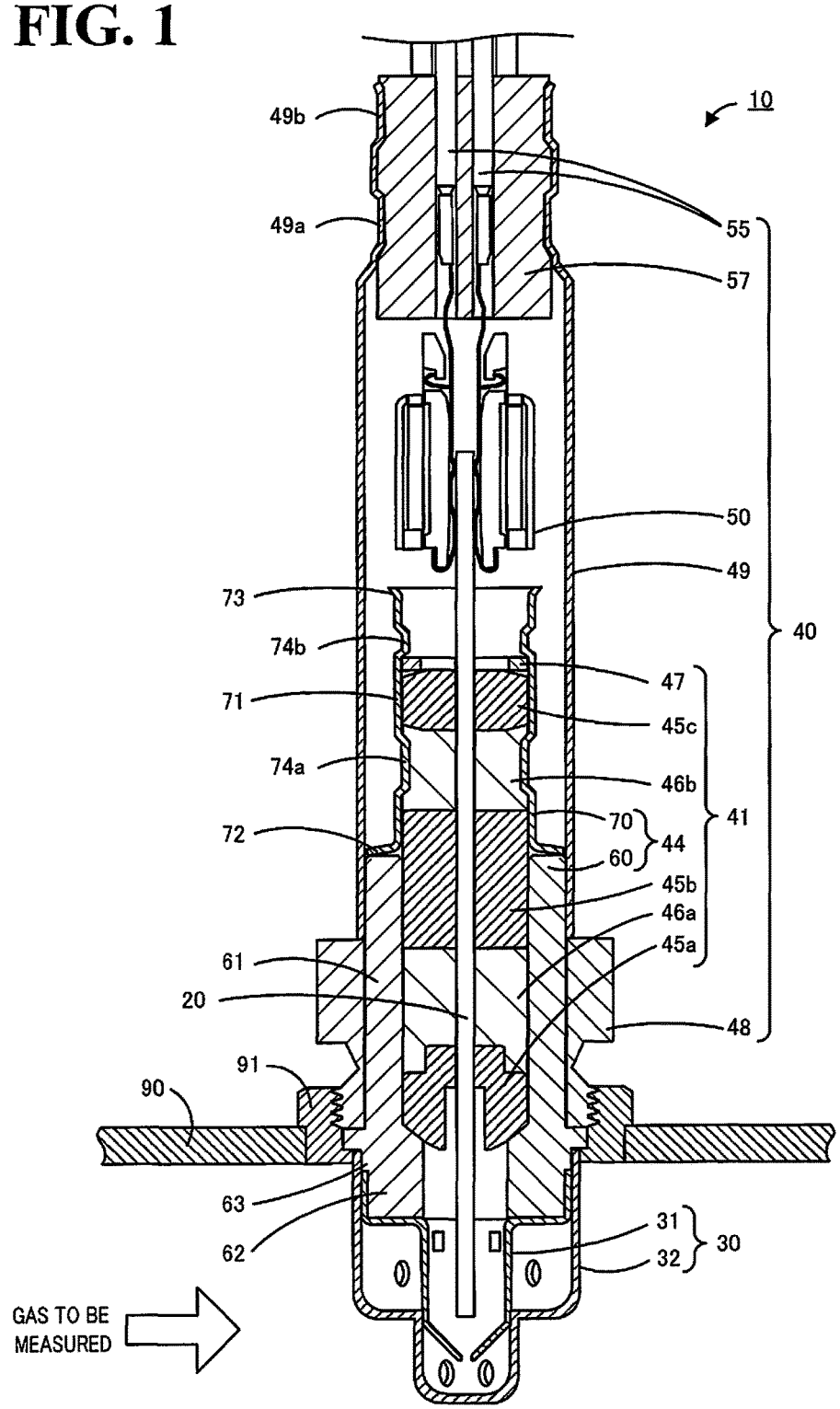
FIG. 1 is a longitudinal sectional view of a gas sensor 10.

Next, an embodiment of the present invention will be described with reference to the drawings. FIG. 1 is a longitudinal sectional view of a gas sensor 10. The gas sensor 10 includes a sensor element 20, a protective cover 30 for protecting one end (a lower end in FIG. 1) of the sensor element 20, and a sensor assembly 40 including a connector 50 that is conductively connected to the sensor element 20. As illustrated, the gas sensor 10 is attached to a pipe 90 such as an exhaust gas pipe of a vehicle, and is used to measure the concentration of a specific gas, such as $NO_x$ or $O_2$, contained in exhaust gas serving as gas to be measured. In this embodiment, the gas sensor 10 measures the $NO_x$ concentration as the concentration of the specific gas.

The protective cover 30 includes an inner protective cover 31 shaped like a bottomed cylinder to cover one end of the sensor element 20, and an outer protective cover 32 shaped like a bottomed cylinder to cover the inner protective cover 31. The inner protective cover 31 and the outer protective cover 32 have a plurality of holes through which the gas to be measured is introduced into the protective cover 30. The one end of the sensor element 20 is disposed in a space surrounded by the inner protective cover 31.

The sensor assembly 40 includes an element sealing member 41 with which the sensor element 20 is sealed and fixed, a nut 48 attached to the element sealing member 41, an outer cylinder 49, and a connector 50 electrically connected to the sensor element 20. The sensor assembly 40 further includes a plurality of lead wires 55 connected to the connector 50, and a rubber plug 57 disposed at an upper end of the outer cylinder 49.

The element sealing member 41 includes a welded body 44 formed by coaxially welding a main metal piece 60 and an inner cylinder 70 each shaped like a cylinder, supporters 45a to 45c sealed inside an inner through hole on an inner side of the welded body 44, pressed powder bodies 46a and 46b, and a metal ring 47. The sensor element 20 is located on the center axis of the element sealing member 41, and penetrates the element sealing member 41 in the front-rear direction.

The main metal piece 60 is a metallic member including a cylindrical body portion 61, a cylindrical thick portion 62 having an inner diameter smaller than that of the body portion 61, and a stepped portion 63 provided on an outer peripheral surface of the thick portion 62. The main metal piece 60 is welded at an upper end of the body portion 61 to a lower end of the inner cylinder 70. The thick portion 62 holds the supporter 45a so that the supporter 45a does not protrude downward in FIG. 1.

The inner cylinder 70 is a metallic member that has a thickness smaller than that of the main metal piece 60, and includes a cylindrical body portion 71, a flange portion 72 provided at an end portion (a lower end in FIG. 1) to be welded to the main metal piece 60, and a diameter-enlarged portion 73 provided at an end portion (an upper end in FIG. 1) opposite from the flange portion 72 so that the inner diameter thereof increases toward the end. The body portion 71 includes a diameter-reduced portion 74a for pressing the pressed powder body 46b toward the center axis of the inner cylinder 70, and a diameter-reduced portion 74b for pressing the supporters 45a to 45c and the pressed powder bodies 46a and 46b in the downward direction in FIG. 1 with the metal ring 47 being disposed therebetween.

The supporters 45a to 45c are members formed of a ceramic material such as alumina, steatite, zirconia, or spinel. The pressed powder bodies 46a and 46b are formed by molding ceramic powder such as talc, alumina powder, or boron nitride. The pressed powder bodies 46a and 46b are compressed between the welded body 44 and the sensor element 20 by the pressing force from the diameter-reduced portions 74a and 74b, so that the pressed powder bodies 46a and 46b seal the through hole in the welded body 44, and fix the sensor element 20.

The nut 48 is fixed coaxially with the main metal piece 60, and has an external thread portion on its outer peripheral surface. The external thread portion of the nut 48 is fitted in a fixing member 91 that is welded to the pipe 90 and has an internal thread portion on its inner peripheral surface. Thus, the gas sensor 10 is fixed to the pipe 90 in a state in which the lower end of the sensor element 20 and the protective cover 30 in the gas sensor 10 protrude into the pipe 90.

The outer cylinder 49 covers the surroundings of the welded body 44, the sensor element 20, and the connector 50, and the plural lead wires 55 connected to the connector 50 are extended outside from an upper end of the outer cylinder 49 in FIG. 1. Inside the outer cylinder 49, the entire inner cylinder 70, a joint portion between the inner cylinder 70 and the main metal piece 60, and a part of the body portion 61 of the main metal piece 60 in the welded body 44 are inserted. Further, an inner peripheral surface of the outer cylinder 49 and an outer peripheral surface of the body portion 61 are fixed to each other by welding. Near the upper end of the outer cylinder 49, swaged portions 49a and 49b swaged into a smaller diameter are provided. The rubber plug 57 is swaged into a smaller diameter together with the outer cylinder 49 by the swaged portions 49a and 49b, and is thereby fixed inside the outer cylinder 49.

The connector 50 is in contact with unillustrated electrodes provided on a surface (right and left surfaces in FIG. 1) at the other end (upper end in FIG. 1) of the sensor element 20 to be electrically connected to these electrodes. The lead wires 55 are conductively connected to the electrodes of the sensor element 20 via the connector 50. The lead wires 55 are extended outside through the rubber plug 57. The rubber plug 57 is disposed to close an opening at the upper end of the outer cylinder 49, and seals a gap between the outer cylinder 49 and the lead wires 55.

Next, a production method for the gas sensor 10 will be described. First, a welded-body production step is performed to produce a welded body 44 by coaxially welding a main metal piece 60 and an inner cylinder 70. In this welded-body production step, first, the main metal piece 60 and the inner cylinder 70 are prepared in Step (a). As the main metal piece 60 and the inner cylinder 70, a main metal piece and an inner cylinder produced beforehand may be prepared, or they may be produced by, for example, casting or forging.

Figure 2:
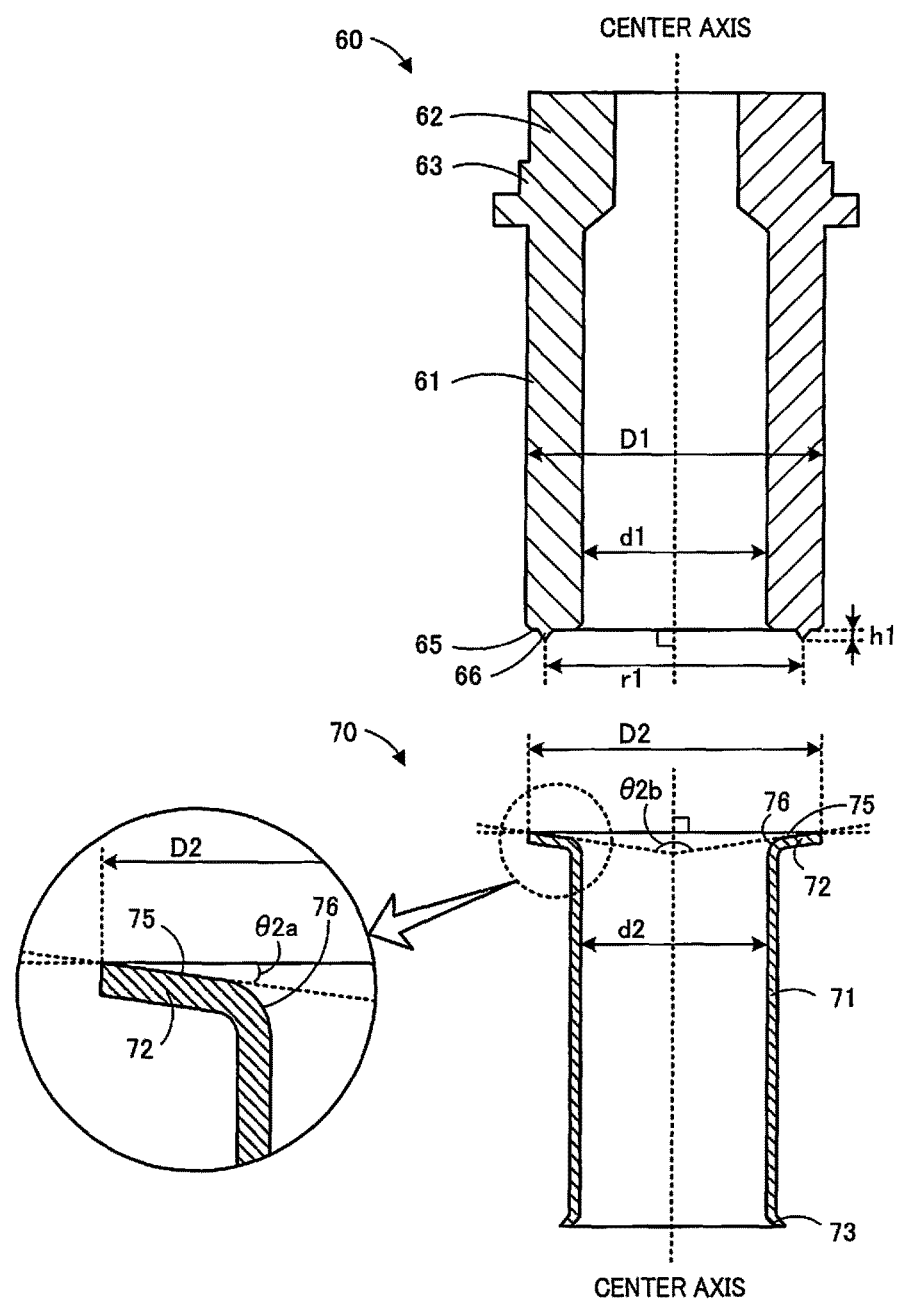
FIG. 2 is a longitudinal sectional view of a main metal piece 60 and an inner cylinder 70 prepared in Step (a).

FIG. 2 is a longitudinal sectional view of the main metal piece 60 and the inner cylinder 70 prepared in Step (a). FIG. 2 illustrates a state in which the main metal piece 60 and the inner cylinder 70 are turned upside down from the state of FIG. 1. The main metal piece 60 includes the body portion 61, the thick portion 62, and the stepped portion 63 described above. At a lower end of the body portion 61 in FIG. 2, a first end surface 65 is provided as an end surface of the main metal piece 60 in the axial direction (up-down direction in FIG. 2) to be welded to the inner cylinder 70.

The first end surface 65 is a surface perpendicular to the center axis of the main metal piece 60. The first end surface 65 has a projection (projecting portion) 66 projecting downward in FIG. 2. The projection 66 is triangular in a cross section of FIG. 2, and is ring-shaped, when viewed along the center axis of the main metal piece 60. A diameter r1 of an end (lower end in FIG. 2) of the projection 66 is smaller than an outer diameter D1 of the body portion 61, and is larger than an inner diameter d1 of the body portion 61. While a projection height h1 of the projection 66 from the first end surface 65 is not particularly limited, for example, it is 0.1 to 1.0 mm. Further, an inner peripheral rim and an outer peripheral rim of the first end surface 65 are chamfered (C-chamfered here), as illustrated in FIG. 2.

The inner cylinder 70 includes the body portion 71, the flange portion 72, and the diameter-enlarged portion 73 described above, and a rising portion 76 serving as a rising portion of the inner peripheral surface from the body portion 71 to the flange portion 72. At this time point, diameter-reduced portions 74a and 74b (see FIG. 1) are not formed in the body portion 71. Further, an upper end of the flange portion 72 in FIG. 2 has a second end surface 75 that serves as an end surface in the axial direction (up-down direction in FIG. 2) of the inner cylinder 70 and that is to be welded to the main metal piece 60. This second end surface 75 is an inclined surface that inclines toward an end portion (lower portion in FIG. 2) opposite from the second end surface 75 as it extends toward the center axis of the inner cylinder 70. As illustrated in an enlarged view of FIG. 2, the second end surface 75 is inclined so that an angle $\theta 2a$ with respect to a direction perpendicular to the center axis of the inner cylinder 70 (right-left direction in FIG. 2) is 5° to 15°. The angle $\theta 2a$ is preferably 5° to 10°. When it is assumed that an angle between portions of the second end surface 75 opposed to each other across the center axis is taken as $\theta 2b$, the angle $\theta 2b$=180°-angle $\theta 2a$×2. That is, when the angle $\theta 2a$ is 5° to 15°, the angle $\theta 2b$ is 170° to 150°. When the angle $\theta 2a$ is 5° to 10°, the angle $\theta 2b$ is 170° to 160°. The rising portion 76 is formed by a curved surface. Although not particularly limited, a curvature radius R of the rising portion 76 is, for example, 0.8 to 1.2 mm. An inner diameter d2 of the body portion 71 is substantially equal to the inner diameter d1 of the body portion 61. Further, an outer diameter D2 of the second end surface 75 of the flange portion 72 (=an outer diameter of an upper end of the flange portion 72 in FIG. 2) is substantially equal to or slightly smaller than the outer diameter D1 of the body portion 61.

Figure 3A:
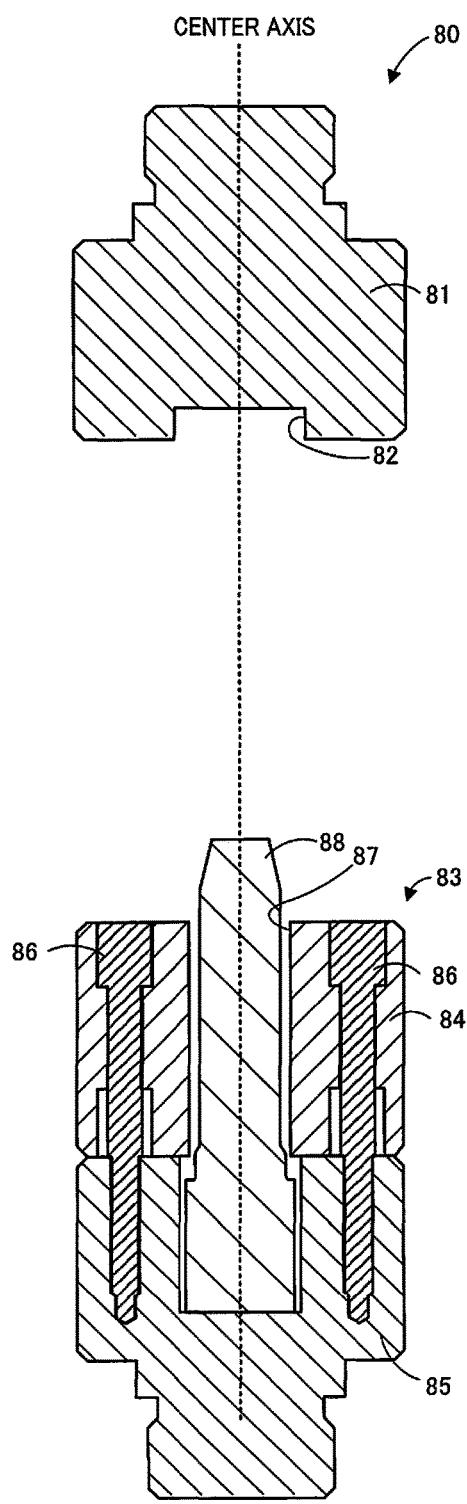
FIGS. 3A-3B show longitudinal sectional views schematically illustrating the manner of Step (b).
Figure 3B:
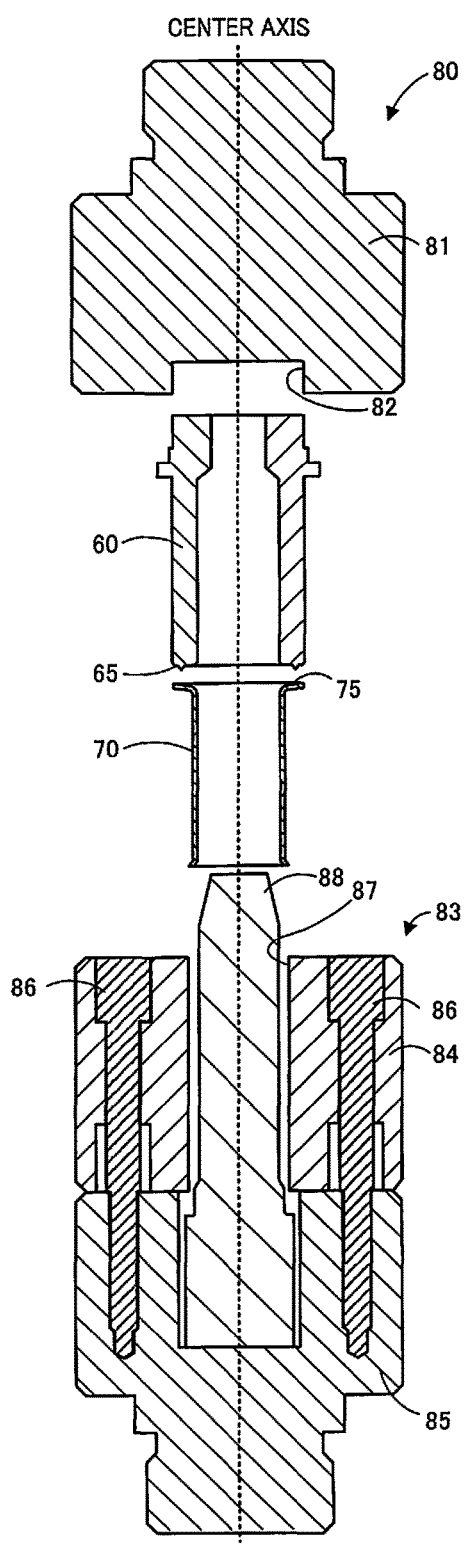

Next, in Step (b), the first end surface 65 of the main metal piece 60 and the second end surface 75 of the inner cylinder 70 are opposed and positioned so that the main metal piece 60 and the inner cylinder 70 are in contact with each other and coaxial with each other. FIG. 3 includes longitudinal sectional views schematically illustrating the manner of Step (b). FIG. 3A is a longitudinal sectional view of a resistance welding jig 80 used for positioning and resistance welding of the main metal piece 60 and the inner cylinder 70. FIG. 3B is a longitudinal sectional view illustrating how the main metal piece 60 and the inner cylinder 70 are positioned by the resistance welding jig 80. FIG. 4 includes longitudinal sectional views schematically illustrating the manners of Step (b) and Step (c) to be described later. FIG. 4A is a longitudinal sectional view illustrating a state in which the main metal piece 60 and the inner cylinder 70 are positioned. FIG. 4B is a longitudinal sectional view illustrating a state in which the main metal piece 60 and the inner cylinder 70 are welded in Step (c).

First, the resistance welding jig 80 will be described. As illustrated in FIG. 3A, the resistance welding jig 80 includes a first electrode 81, a second electrode 83, and a guide pin 88. Such a resistance welding jig is described in PTL 1 described above.

The first electrode 81 positions the main metal piece 60 at the time of resistance welding, and voltage is applied between the first electrode 81 and the second electrode 83. The first electrode 81 has a recess 82 in which the main metal piece 60 is to be inserted for positioning. The first electrode 81 is used with its center axis being aligned with the second electrode 83 and the guide pin 88.

The second electrode 83 positions the inner cylinder 70 at the time of resistance welding, and voltage is applied between the second electrode 83 and the first electrode 81. The second electrode 83 includes conductors 84 and 85 and a plurality of fixing pins 86. The conductors 84 and 85 are cylindrical members. The conductors 84 and 85 have the same outer diameter, and are superposed and fixed by the plural fixing pins 86 so that the center axes of the outer circumferences thereof are coaxial with each other. Thus, a through hole of the conductor 84 and a bottomed hole of the conductor 85 communicate with each other to form a guide-pin insertion hole 87. All of the center axes of the conductors 84 and 85 and the center axis of the guide-pin insertion hole 87 are coaxially located.

The guide pin 88 is a ceramic member formed of, for example, silicon nitride ($Si_3N_4$), zirconia ($ZrO_2$), or alumina ($Al_2O_3$), and is a columnar member that maintains the coaxial state of the main metal piece 60 and the inner cylinder 70. As illustrated in FIG. 3A, the guide pin 88 is inserted in the guide-pin insertion hole 87, and is used for resistance welding while being positioned so that its center axis is aligned with the guide-pin insertion hole 87. In this positioned state, a gap in which the diameter-enlarged portion 73 and the body portion 71 of the inner cylinder 70 can be inserted is formed between the guide pin 88 and the conductor 84.

In Step (b), first, this resistance welding jig 80 is prepared (FIG. 3A). Next, as illustrated in FIG. 3B, the inner cylinder 70 with the second end surface 75 located on the upper side, the main metal piece 60 with the first end surface 65 located on the lower side, and the first electrode 81 are moved downward in this order toward the guide pin 88. Thus, as illustrated in FIG. 4A, the diameter-enlarged portion 73 and the body portion 71 of the inner cylinder 70 are inserted in the guide-pin insertion hole 87, the guide pin 88 penetrates the inner cylinder 70, and the inner cylinder 70 is positioned. Further, a lower surface of the flange portion 72 (surface opposite from the second end surface 75) and an upper surface of the conductor 84 are brought into contact with each other. The main metal piece 60 is positioned coaxially with the inner cylinder 70 by insertion of the guide pin 88. Further, an end portion of the main metal piece 60 on the side of the thick portion 62 is inserted in the recess 82 of the first electrode 81, so that the first electrode 81 and the main metal piece 60 are positioned.

In such a state in which the main metal piece 60 and the inner cylinder 70 are positioned, as illustrated in an enlarged view of FIG. 4A, the projection 66 of the main metal piece 60 and the second end surface 75 of the inner cylinder 70 are in contact with each other, and the main metal piece 60 and the inner cylinder 70 are not in contact in other portions. Since the second end surface 75 is inclined at the angle θ2a, the distance between the first end surface 65 and the second end surface 75 increases toward the center axis. Further, since the first end surface 65 is a surface perpendicular to the center axis of the main metal piece 60, an angle θc between the first end surface 65 and the second end surface 75 is equal to the angle θ2a (5° to 15°). The diameter r1 and the projection height h1 of the projection 66 can be appropriately determined so that the projection 66 of the main metal piece 60 and the second end surface 75 of the inner cylinder 70 are in contact with each other and the main metal piece 60 and the inner cylinder 70 are not in contact with each other in other portions. For example, it may be possible that outer diameter D2>diameter r1>inner diameter d2 or that (outer diameter D2−0.5 nm)≥diameter r1≥(inner diameter d2+0.5 mm).

Next, in Step (c), the first end surface 65 and the second end surface 75 are resistance-welded to form a welded body 44 by energizing the contact portion between the main metal piece 60 and the inner cylinder 70 in a state in which the main metal piece 60 and the inner cylinder 70 are pressed in directions to approach each other. Specifically, voltage is applied between the first electrode 81 and the second electrode 83 while pressing the first electrode 81 and the second electrode 83 in the directions to approach each other (the pressure at this time is also noted as forging pressure). Thus, the projection 66 and its surroundings are melted to form a welded portion 67 illustrated in an enlarged view of FIG. 4B, and the main metal piece 60 and the inner cylinder 70 are welded into a welded body 44. Although not particularly limited, welding conditions may be, for example, such that the applied voltage is 330 to 450 V, the current is 25 to 35 kA, the forging pressure is 0.2 to 0.35 MPa, and the energizing time is 3 to 10 msec, or such that the applied voltage is 395 to 415 V, the current is 30.9 to 33.7 kA, the forging pressure is 0.23 to 0.25 MPa, and the energizing time is 5.89 to 9.22 msec.

When the welded body 44 is produced by performing Steps (a) to (c), as described above, next, an element fixing step is performed to insert and fix a sensor element 20 in the welded body 44. FIG. 5 includes longitudinal sectional views schematically illustrating the manner of the element fixing step. In the element fixing step, first, a metal ring 47, supporters 45a to 45c, and pressed powder bodies 46a and 46b through which the sensor element 20 penetrates are inserted into the welded body 44 illustrated in FIG. 5A in the order of FIG. 5B from the side of the diameter-enlarged portion 73. Next, the pressed powder bodies 46a and 46b are compressed by pressing the metal ring 47 and the main metal piece 60 in the directions to approach each other, and the inside of the main metal piece 60 and the inside of the inner cylinder 70 are thereby sealed. In this state, a portion of the inner cylinder 70 closer to the diameter-enlarged portion 73 than the metal ring 47 is swaged to form a diameter-reduced portion 74b (FIG. 5C). This maintains the pressing force between the metal ring 47 and the thick portion 62 of the main metal piece 60. Subsequently, a portion of the body portion 71 of the inner cylinder 70 located on a side surface of the pressed powder body 46b is swaged to form a diameter-reduced portion 74a (FIG. 5D). This reliably seals the inside of the welded body 44 and fixes the sensor element 20. Through the above steps, an element sealing member 41 illustrated in FIG. 1 is produced, and the sensor element 20 is fixed inside the welded body 44 of the element sealing member 41. A member composed of the element sealing member 41 and the sensor element 20 is referred to as a primary assembly 141.

When the primary assembly 141 is produced by performing the element fixing step, an inner protective cover 31 and an outer protective cover 32 are welded and fixed to a stepped portion 63 of the main metal piece 60 to form a protective cover 30, the primary assembly 141 is inserted into a nut 48, and the nut 48 is attached to the main metal piece 60. Then, lead wires 55 and a connector 50 connected thereto are prepared, and the connector 50 is connected to the other end of the sensor element 20 (upper end in FIG. 1).

Figure 6:
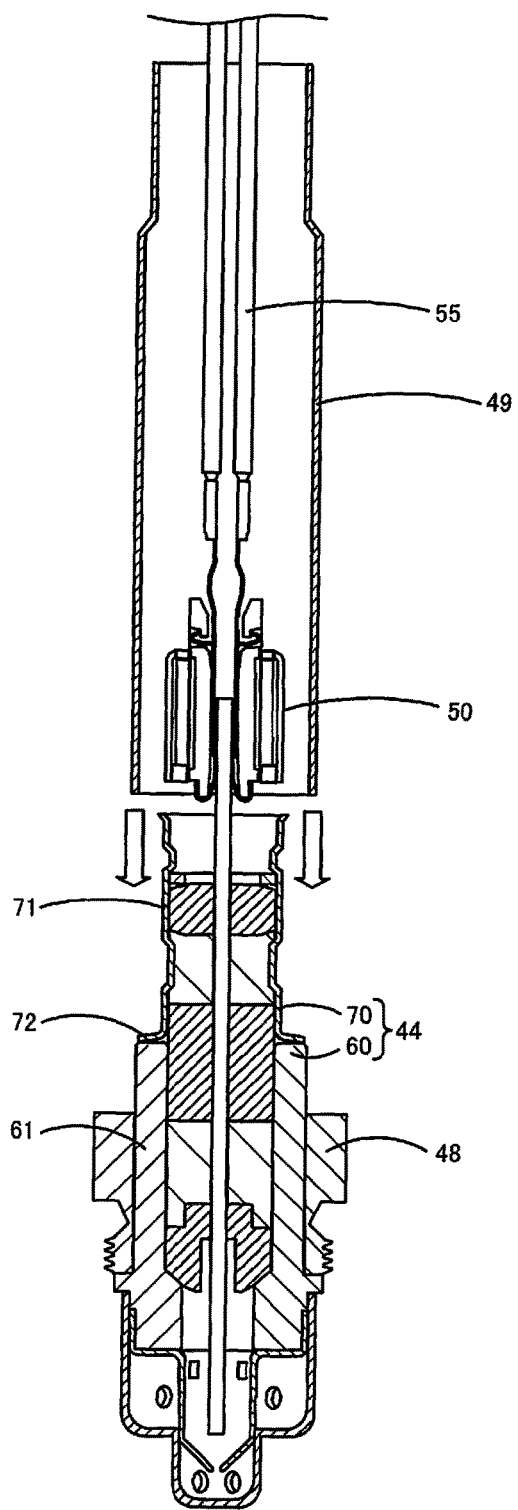
FIG. 6 is a longitudinal sectional view schematically illustrating the manner of an outer-cylinder fixing step.

After that, at least the joint portion of the welded body 44 between the main metal piece 60 and the inner cylinder 70 is inserted into an outer cylinder 49, and an outer-cylinder fixing step is performed to fix the outer cylinder 49 and the welded body 44 in a state in which an inner peripheral surface of the outer cylinder 49 and an outer peripheral surface of the welded body 44 are in contact with each other. Specifically, as illustrated in FIG. 6, the outer cylinder 49 is put on the lead wires 55, the connector 50, and the welded body 44 from the upper side of FIG. 6 so that the lead wires 55, the connector 50, and the welded body 44 are inserted therein, and a lower end of the outer cylinder 49 is brought into contact with an upper part of the nut 48. Thus, as illustrated in FIG. 1, the entire inner cylinder 70, the joint portion between the main metal piece 60 and the inner cylinder 70, and a part of the body portion 71 of the inner cylinder 70 in the welded body 44 are inserted in the outer cylinder 49. Then, the inner peripheral surface of the outer cylinder 49 and the outer peripheral surface of the body portion 61 of the main metal piece 60 are welded while being in contact with each other to fix the welded body 44 and the outer cylinder 49 together. Subsequently, a rubber plug 57 having a plurality of through holes is prepared, and the rubber plug 57 is inserted in the outer cylinder 49 by passing the lead wires 55 through the through holes of the rubber plug 57. Then, the outer cylinder 49 is swaged into a smaller diameter to form swaged portions 49a and 49b, and the rubber plug 57 and the outer cylinder 49 are thereby fixed. Thus, a gas sensor 10 of FIG. 1 is obtained. The protective cover 30 may be attached after the outer-cylinder fixing step and swaging.

Figure 7A:
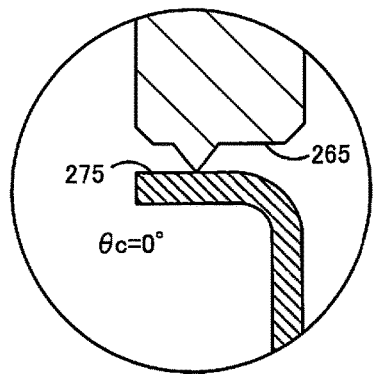
FIGS. 7A-7B show longitudinal sectional views schematically illustrating the manner of welding when the angle θc=0°.
Figure 7B:
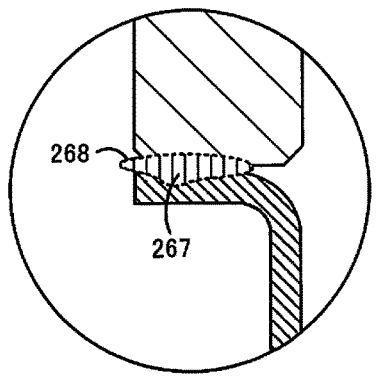

Here, a description will be given of the reason why the second end surface 75 is formed by an inclined surface and the angle θc (=angle θ2a) is set at 5° to 15°, as illustrated in FIG. 4A, when the main metal piece 60 and the inner cylinder 70 are subjected to resistance welding. If the distance between the first end surface 65 and the second end surface 75 increases toward the center axis in a state in which the main metal piece 60 and the inner cylinder 70 are positioned, a space that widens toward the center axis is present between the first end surface 65 and the second end surface 75. For this reason, in the joint portions (portions of the first end surface 65 and the second end surface 75) during resistance welding, melted metal is likely to flow toward the center axis, but is not likely to flow toward the radial outer side. Thus, the welded portion 67 after welding illustrated in FIG. 4B is unlikely to protrude outside from the outer peripheral surfaces of the main metal piece 60 and the inner cylinder 70. In contrast, for example, when a first end surface 265 and a second end surface 275 are both perpendicular to the center axis and the angle θc=0°, as illustrated in FIG. 7A, melted metal is more likely to flow toward the radial outer side than in the case of FIG. 4, and a protruding portion 268 on the radial outer side is likely to be formed in a welded portion 267, as illustrated in FIG. 7B. In this way, in this embodiment, formation of the protruding portion on the radial outer side of the welded body 44 is suppressed by positioning the first end surface 65 and the second end surface 75 so that the distance therebetween increases toward the center axis. At this time, since the angle θc is 5° or more, the effect of suppressing formation of the protruding portion on the radial outer side can be obtained more reliably. Further, since the angle θc is 15° or less, the joint strength between the main metal piece 60 and the inner cylinder 70 in the welded body 44 is sufficient. After welding, that is, in the welded body 44, the angle θc does not always need to be within the range of 5° to 15°.

Here, the correspondence relationship between the constituent elements of this embodiment and the constituent elements of the present invention will be clarified. The main metal piece 60 of this embodiment corresponds to the first cylindrical body of the present invention, the inner cylinder 70 corresponds to the second cylindrical body, the first end surface 65 corresponds to the first end surface, and the second end surface 75 corresponds to the second end surface and the inclined surface.

According to the above-described production method for the welded body 44 of this embodiment, the distance between the first end surface 65 and the second end surface 75 positioned in Step (b) increases toward the center axis and the angle θc is 5° to 15°. Hence, it is possible to suppress formation of the protruding portion on the radial outer side of the welded body 44. Further, the joint strength between the main metal piece 60 and the inner cylinder 70 in the welded body 44 is further increased by setting the angle θc at 10° or less.

In the main metal piece 60 and the inner cylinder 70 prepared in Step (a), the second end surface 75 is an inclined surface and the first end surface 65 is a surface perpendicular to the axial direction. For this reason, formation of the protruding portion on the radial outer side can be suppressed while giving a relatively simpler shape to one of the cylindrical bodies (here, the main metal piece 60) than in the case in which both the first end surface 65 and the second end surface 75 are inclined surfaces.

The inner cylinder 70 prepared in Step (a) includes the cylindrical body portion 71 having an outer diameter smaller than that of the main metal piece 60, and the flange portion 72 provided coaxially with the body portion 71 and having the second end surface 75. For this reason, even when the outer diameter of the body portion 71 is smaller than the outer diameter D1 of the main metal piece 60, since the inner cylinder 70 has the flange portion 72, the joint area is easily ensured between the first end surface 65 and the second end surface 75.

In the inner cylinder 70 prepared in Step (a), the rising portion 76 of the inner peripheral surface from the body portion 71 to the flange portion 72 is formed by a curved surface. Thus, during resistance welding in Step (c), melted metal in the joint portions is unlikely to protrude toward the radial inner side from the inner peripheral surface of the body portion 71 of the inner cylinder 70. For this reason, it is possible to suppress formation of a protruding portion on the radial inner side. This reason is considered as follows. That is, when the rising portion 76 is a curved surface, the space between the rising portion 76 and the first end surface 65 is relatively larger than, for example, when the rising portion 76 is shaped like a polygonal line formed by the second end surface 75 and the inner peripheral surface of the body portion 71 in cross section. Thus, more melted metal can be present in this space, and is unlikely to protrude toward the radial inner side.

In the main metal piece 60 and the inner cylinder 70 prepared in Step (a), the projection 66 is provided on the first end surface 65. In Step (b), positioning is performed so that the main metal piece 60 and the inner cylinder 70 are in contact with each other with the projection 66 being disposed therebetween. Thus, the current of energization can be concentrated at the projection 66, and the main metal piece 60 and the inner cylinder 70 can be joined more reliably.

In the above-described production method for the gas sensor 10 according to the embodiment, at least the welded portion between the main metal piece 60 and the inner cylinder 70 in the welded body 44 is inserted into the outer cylinder 49 in the outer-cylinder fixing step, and the inner peripheral surface of the outer cylinder 49 and the outer peripheral surface of the welded body 44 (main metal piece 60) are fixed to each other while being in contact with each other. For this reason, if a protruding portion is formed outside the outer peripheral surface of the welded body 44, the welded body 44 sometimes cannot be inserted in the outer cylinder 49. In this case, it is necessary to perform the outer-cylinder fixing step after removing the protruding portion. Therefore, it is highly significant to suppress formation of the protruding portion on the radial outer side during production of the welded body 44.

It is needless to say that the present invention is not limited to the above-described embodiment and can be carried out by various modes as long as the modes belong to the technical scope of the present invention.

Figure 8:
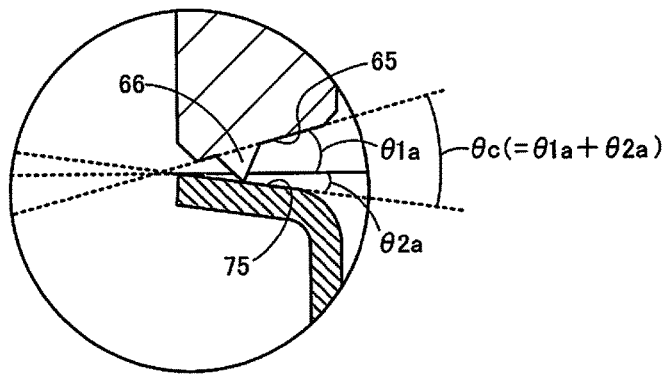
FIG. 8 is an enlarged sectional view of a first end surface 65 and a second end surface 75 in a modification.

For example, while the second end surface 75 is an inclined surface and the first end surface 65 is a surface perpendicular to the axial direction in the above-described embodiment, the present invention is not limited thereto. It is only necessary to form at least one of the first end surface 65 and the second end surface 75 by an inclined surface so that the distance between the first end surface 65 and the second end surface 75 increases toward the center axis in the state positioned in Step (b) and so that the angle θc is 5° to 15°. For example, both of the first end surface 65 and the second end surface 75 may be inclined surfaces. FIG. 8 is an enlarged sectional view of a first end surface 65 and a second end surface 75 in this modification. In FIG. 8, the second end surface 75 is inclined similarly to the above-described embodiment. The first end surface 65 is an inclined surface that inclines toward an end portion opposite from the first end surface 65 (toward a thick portion 62) as it extends toward the center axis of a main metal piece 60. The angle between the first end surface 65 and the direction perpendicular to the center axis of the main metal piece 60 (right-left direction in FIG. 8) is taken as an angle θ1a. In this case, the distance between the first end surface 65 and the second end surface 75 also increases toward the center axis. An angle θc between the first end surface 65 and the second end surface 75 is the sum of the angle θ1a and and an angle θ2a. For this reason, as long as the angle θ1a and the angle θ2a are angles such that the angle θc (=angle θ1a+angle θ2a) is 5° to 15°, the effect of suppressing formation of a protruding portion on the radial outer side of the welded body 44 can be obtained, similarly to the above-described embodiment. Since it is only necessary that the angle θc should be 5° to 15°, for example, the angle θ2a may be 0° (the second end surface 75 is perpendicular to the axial direction). In this case, it is only necessary that the angle θ1a should be 5° to 15°.

Figure 9:
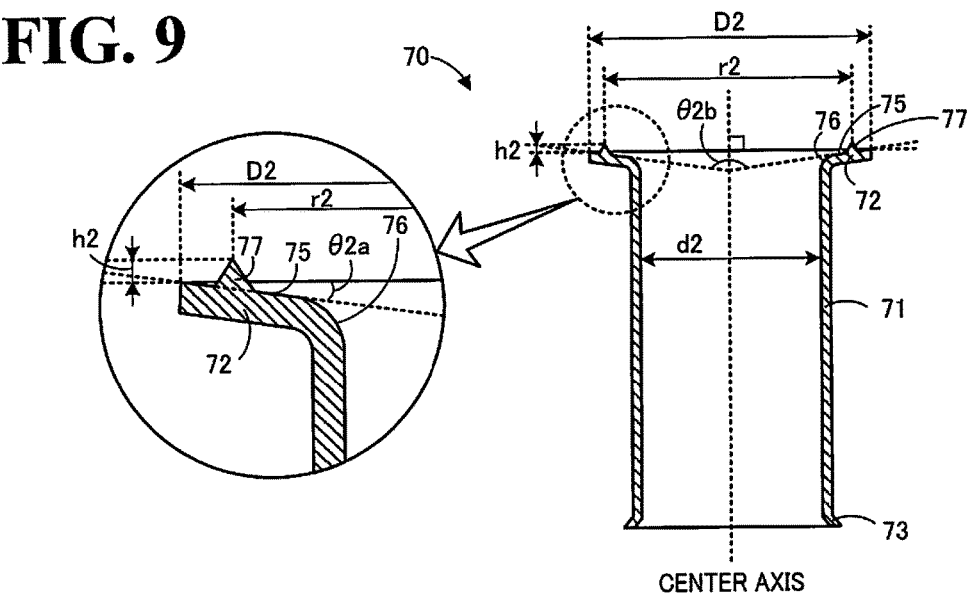
FIG. 9 is a longitudinal sectional view of an inner cylinder 70 in the modification.

While the projection 66 is provided on the first end surface 65 in the above-described embodiment, the present invention is not limited thereto. For example, a projection may be provided on the second end surface 75, not on the first end surface 65. FIG. 9 is a longitudinal sectional view of an inner cylinder 70 having a projection 77 in a modification. As illustrated in FIG. 9, when the diameter of the projection 77 provided on a second end surface 75 is taken as a diameter r2 and the height from (the uppermost end of) the second end surface 75 is taken as a projection height h2, the diameter r2 and the projection height h2 may be appropriately determined so that the projection 77 is in contact with a first end surface 65 of a main metal piece 60 and the main metal piece 60 and the inner cylinder 70 are not in contact with each other in other portions in Step (b) described above. For example, it may be possible that (outer diameter of first end surface 65)>diameter r2>(inner diameter of first end surface 65) or that (outer diameter of first end surface 65−0.5 mm)≥diameter r2≥(inner diameter of first end surface 65+0.5 mm). When an outer peripheral rim of the first end surface 65 is not chamfered, the outer diameter of the first end surface 65=the outer diameter D1. Similarly, when an inner peripheral rim of the first end surface 65 is not chamfered, the inner diameter of the first end surface 65=the inner diameter d1.

While the welded body 44 is produced by so-called projection welding in which the main metal piece 60 and the inner cylinder 70 are resistance-welded while being in contact with each other with the projection 66 being disposed therebetween in the above-described embodiment, the present invention is not limited thereto. It is only necessary to produce the welded body 44 by resistance welding. For example, the projection does not have to be provided in any of the first end surface 65 and the second end surface 75. In this case, for example, the main metal piece 60 may have a flange portion, and the welded body 44 may be produced by spot welding while the flange portion of the main metal piece 60 and the flange portion 72 of the inner cylinder 70 are opposed to each other.

While the main metal piece 60 and the inner cylinder 70 are given as examples of the first cylindrical body and the second cylindrical body in the above-described embodiment, the shapes of the first cylindrical body and the second cylindrical body are not limited thereto. For example, the inner cylinder 70 does not have to include the flange portion 72. The rising portion 76 of the inner cylinder 70 does not have to be formed by a curved surface. The outer diameter of the inner cylinder 70 may be equal to the outer diameter D1 of the main metal piece 60. The inner diameter d1 of the main metal piece 60 may be different from the inner diameter d2 of the inner cylinder 70. At least one of the inner peripheral rim and the outer peripheral rim of the first end surface 65 does not have to be chamfered. Further, the joint body obtained by welding the first cylindrical body and the second cylindrical body is not limited to the joint body for use in the gas sensor 10.

While the angle θ2b=180°−angle θ2a×2 in the above-described embodiment, the present invention is not limited thereto. For example, the portions of the second end surface 75 opposed with each other across the center axis may be asymmetrical. In such a case, it is also only necessary that the angle θc between the first end surface 65 and the second end surface 75 opposed to each other during positioning should be within the range of 5° to 15°.

EXAMPLES

Cases in which a welded body 44 was specifically produced will be described below as Examples. The present invention is not limited to the following Examples.

Example 1

A main metal piece 60 and an inner cylinder 70 having the shapes illustrated in FIG. 2 were prepared, and a welded body 44 was produced as Example 1 by the above-described production method. The material of the main metal piece 60 and the inner cylinder 70 was SUS 430. The outer diameter D1 and the inner diameter d1 of a body portion 61 of the main metal piece 60 were 14.5 mm and 9 mm, respectively, the diameter r1 of an end (a lower end in FIG. 2) of a projection 66 was 12.5 mm, and the protrusion height h1 of the projection 66 was 0.5 mm. The outer diameter D2 of a second end surface 75 of the inner cylinder 70 was 14 nut, the inner diameter d2 of a body portion 71 was 9 mm, the curvature radius R of a rising portion 76 was 1 mm, the angle θ2a (=angle θc) was 5°, and the angle θ2b was 170°. The thicknesses of the body portion 71, a flange portion 72, and the rising portion 76 were 0.5 mm. Welding conditions were such that the applied voltage was 330 V, the current was 30 kA, the forging pressure was 0.27 MPa, and the energizing time was 7.8 sec.

Examples 2 to 5

Welded bodies 44 were produced as Examples 2 to 5 in a manner similar to that of Example 1 except that the angle θ2a (=angle θc) and the angle θ2b were variously changed. Specifically, in Example 2, the angle θ2a (=angle θc) was 7.5°, the angle θ2b was 165°, and the outer diameter D2 was 14.0 mm. In Example 3, the angle θ2a (=angle θc) was 10°, the angle θ2b was 160°, and the outer diameter D2 was 14.03 mm. In Example 4, the angle θ2a (=angle θc) was 12.5°, the angle θ2b was 155°, and the outer diameter D2 was 14.06 mm. In Example 5, the angle θ2a (=angle θc) was 15°, the angle θ2b was 150°, and the outer diameter D2 was 14.09 mm.

Comparative Example 1

As illustrated in FIG. 7, a welded body 44 was produced as Comparative Example 1 in a manner similar to that of Example 1 except that the angle θ2a (=angle θc) was 0°, the angle θ2b was 180°, and the outer diameter D2 was 14.0 mm.

Evaluation Test 1

300 welded bodies 44 were produced in correspondence with each of Examples 1 to 5 and Comparative Example 1, and the protrusion state on the radial outer side and the protrusion state on the radial inner side were judged. Specifically, a pin gauge having a diameter of 8.9 mm was passed through each welded body 44. When the pin gauge was passed therethrough, it was determined that the protrusion state on the radial inner side was good (a protruding portion was not provided or there was no problem even when the protruding portion was provided). Similarly, a ring gauge having a diameter of 14.70 mm was passed around the welded body 44. When the ring gauge was passed therearound, it was determined that the protrusion state on the radial outer side was good (a protruding portion was not provided or there was no problem even when the protruding portion was provided). In all of 300 welded bodies 44 in each of Examples 1 to 5, the protrusion state was good on the radial outer side and the radial inner side. In contrast, in Comparative Example 1, 10 welded bodies 44 of the 300 welded bodies 44 were poor in the protrusion state on the radial outer side, and all of the 300 welded bodies 44 were good in the protrusion state on the radial inner side. From the above, it was confirmed that formation of the protruding portion on the radial outer side could be suppressed by setting the angle θc at 5° to 15°.

Figure 10:
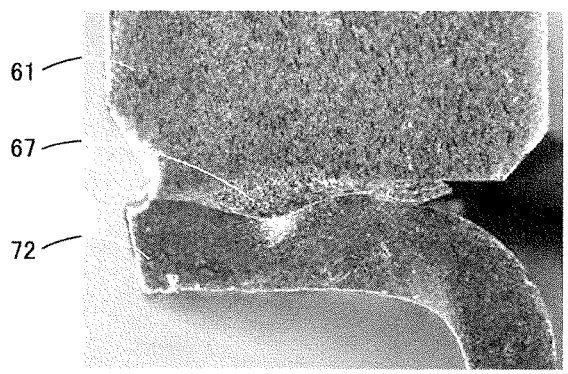
FIG. 10 is an enlarged photograph of a cross section of a joint portion of a welded body 44 according to Example 1.
Figure 11:
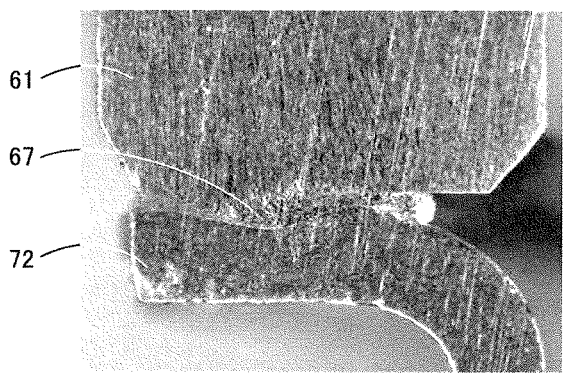
FIG. 11 is an enlarged photograph of a cross section of a joint portion of a welded body 44 according to Example 2.
Figure 12:
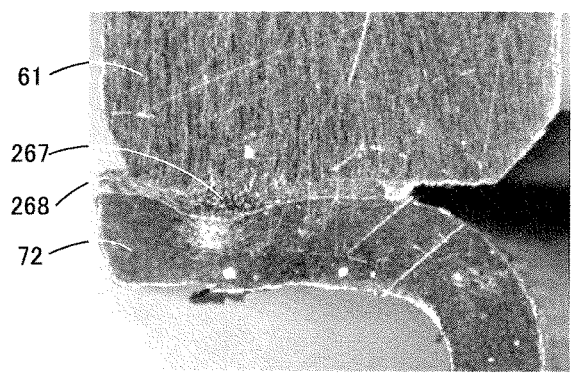
FIG. 12 is an enlarged photograph of a cross section of a joint portion of a welded body 44 according to Comparative Example 1.

FIGS. 10 to 12 are enlarged photographs of cross sections of joint portions in the welded bodies 44 of Examples 1 and 2 and Comparative Example 1, respectively. As shown in FIG. 12, in Comparative Example 1, a part of a welded portion 267 became a protruding potion 268 on the radial outer side, similarly to FIG. 7. In contrast, as shown in FIGS. 10 and 11, a protruding portion on the radial outer side was not formed in a welded portion 67 of the welded body 44 in Examples 1 and 2. In Example 1 and Comparative Example 1, the outer diameter D2 of the second end surface 75 was the same (14.0 mm). However, as can be seen from FIGS. 10 and 12, an end portion (left end portion in FIG. 12) on the radial outer side of the flange portion 72 in Comparative Example 1 protruded more to the outer side (left side in FIG. 12) than in Example 1. This is considered because the flange portion 72 was expanded toward the radial outer side by forging pressure in welding. That is, it is considered that, since the angle θc is 5° and the second end surface 75 is inclined in Example 1, the flange portion 72 is likely to be expanded more toward the radial inner side than toward the radial outer side by forging pressure in welding. In contrast, it is considered that, since the angle θc is 0° and the second end surface 75 is not inclined in Comparative Example 1, the flange portion 72 is likely to be expanded to the same extent toward the radial outer side and the radial inner side by forging pressure in welding. It is considered that the end portion of the flange portion 72 on the radial outer side in Comparative Example 1 protrudes more than in Example 1 because of this difference.

Evaluation Test 2

The welded bodies 44 of Examples 1 to 5 were inspected for the joint strength between the main metal piece 60 and the inner cylinder 70 (peeling test). As a result, the joint strengths of the welded bodies 44 according to Examples 1 to 3 were higher than those of the welded bodies 44 according to Examples 4 and 5. From the above, it could be confirmed that the joint strength between the main metal piece 60 and the inner cylinder 70 was further increased by setting the angle θc at 10° or less.

This application claims priority from Japanese Patent Application No. 2014-215498 filed on Oct. 22, 2014, the entire contents of which are incorporated herein by reference.

What is claimed is:

1. A production method for a welded body in which a first cylindrical body and a second cylindrical body formed of metal are coaxially welded, the production method comprising:
   (a) a step of preparing the first cylindrical body and the second cylindrical body;
   (b) a step of coaxially positioning the first cylindrical body and the second cylindrical body to bring into contact with each other while opposing a first end surface serving as an end surface of the first cylindrical body in an axial direction to a second end surface serving as an end surface of the second cylindrical body in the axial direction; and
   (c) a step of resistance-welding the first end surface and the second end surface to produce the welded body by energizing a contact portion between the first cylindrical body and the second cylindrical body in a state in which the first cylindrical body and the second cylindrical body are pressed in directions to approach each other,
   wherein, in the first cylindrical body and the second cylindrical body prepared in the step (a), at least one of the first end surface and the second end surface is an inclined surface that inclines toward an end portion opposite from the one end surface as the one end surface extends toward a center axis of the first cylindrical body and the second cylindrical body, and the inclined surface inclines so that a distance between the first end surface and the second end surface positioned in the step (b) increases toward the center axis and so that an angle θc between the first end surface and the second end surface is 5° to 15°, wherein the welded body included in a gas sensor.

2. The production method for the welded body according to claim 1, wherein the angle θc is 5° to 10°.

3. The production method for the welded body according to claim 1, wherein, in the first cylindrical body and the second cylindrical body prepared in the step (a), one of the first end surface and the second end surface is the inclined surface, and the other end surface is a surface perpendicular to the axial direction.

4. The production method for the welded body according to claim 1, wherein the second cylindrical body prepared in the step (a) includes a cylindrical body portion having an outer diameter smaller than that of the first cylindrical body, and a flange portion provided coaxially with the body portion and having the second end surface.

5. The production method for the welded body according to claim 4, wherein a rising portion of an inner peripheral surface from the body portion to the flange portion in the second cylindrical body prepared in the step (a) is a curved surface.

6. The production method for the welded body according to claim 1, wherein, in the first cylindrical body and the second cylindrical body prepared in the step (a), one of the first end surface and the second end surface has a projection, and wherein the positioning is performed in the step (b) so that the first cylindrical body and the second cylindrical body are in contact with each other with the projection being disposed therebetween.

7. The production method for the welded body according to claim 1, wherein the inclined surface inclines at a constant angle toward the center axis.

8. A production method for a gas sensor including an outer cylinder, a welded body disposed inside the outer cylinder, and a sensor element disposed inside the welded body, the production method comprising:

(1) a welded-body production step of producing the welded body by the production method according to claim 1;

(2) an element fixing step of inserting and fixing the sensor element in the welded body; and (3) an outer-cylinder fixing step of inserting at least a joint portion between the first cylindrical body and the second cylindrical body of the welded body into the outer cylinder and fixing an inner peripheral surface of the outer cylinder and an outer peripheral surface of the welded body in a state in which the inner peripheral surface of the outer cylinder and the outer peripheral surface of the welded body are in contact with each other.

* * * * *